United States Patent
Tokumoto

(10) Patent No.: US 8,599,431 B2
(45) Date of Patent: Dec. 3, 2013

(54) PRINT-DATA PROCESSING APPARATUS AND PRINT-DATA PROCESSING METHOD

(75) Inventor: Hirokazu Tokumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1246 days.

(21) Appl. No.: 12/104,210

(22) Filed: Apr. 16, 2008

(65) Prior Publication Data

US 2008/0259392 A1 Oct. 23, 2008

(30) Foreign Application Priority Data

Apr. 19, 2007 (JP) ................. 2007-110956

(51) Int. Cl.
*G06K 15/00* (2006.01)

(52) U.S. Cl.
USPC ........... 358/1.9; 358/1.1; 358/1.18; 358/1.15; 358/1.13

(58) Field of Classification Search
USPC .............. 358/1.1, 1.9, 1.18; 715/274, 243; 101/481
See application file for complete search history.

(56) References Cited

U.S. PATENT DOCUMENTS

| | | | |
|---|---|---|---|
| 6,817,791 B2 * | 11/2004 | Klassen | 400/62 |
| 6,844,940 B2 * | 1/2005 | Warmus et al. | 358/1.18 |
| 6,919,967 B1 | 7/2005 | Pentecost et al. | |
| 7,434,160 B2 * | 10/2008 | Peiro et al. | 715/249 |
| 7,505,172 B2 * | 3/2009 | Vondran et al. | 358/1.9 |
| 2003/0237054 A1 * | 12/2003 | Donahue | 715/525 |
| 2005/0162676 A1 * | 7/2005 | Aoki | 358/1.13 |
| 2007/0046995 A1 * | 3/2007 | Toda | 358/1.16 |
| 2008/0165383 A1 * | 7/2008 | Myoki | 358/1.15 |

FOREIGN PATENT DOCUMENTS

JP 2001-199105 A 7/2001

* cited by examiner

*Primary Examiner* — King Poon
*Assistant Examiner* — Lawrence Wills
(74) *Attorney, Agent, or Firm* — Canon USA, Inc., IP Division

(57) ABSTRACT

Print data in which a reusable object whose range of reuse is specified is defined is received. The range of reuse of the reusable object is changed according to a page layout defined by a print setting. Accordingly, the cache period of the reusable object is optimized.

9 Claims, 18 Drawing Sheets

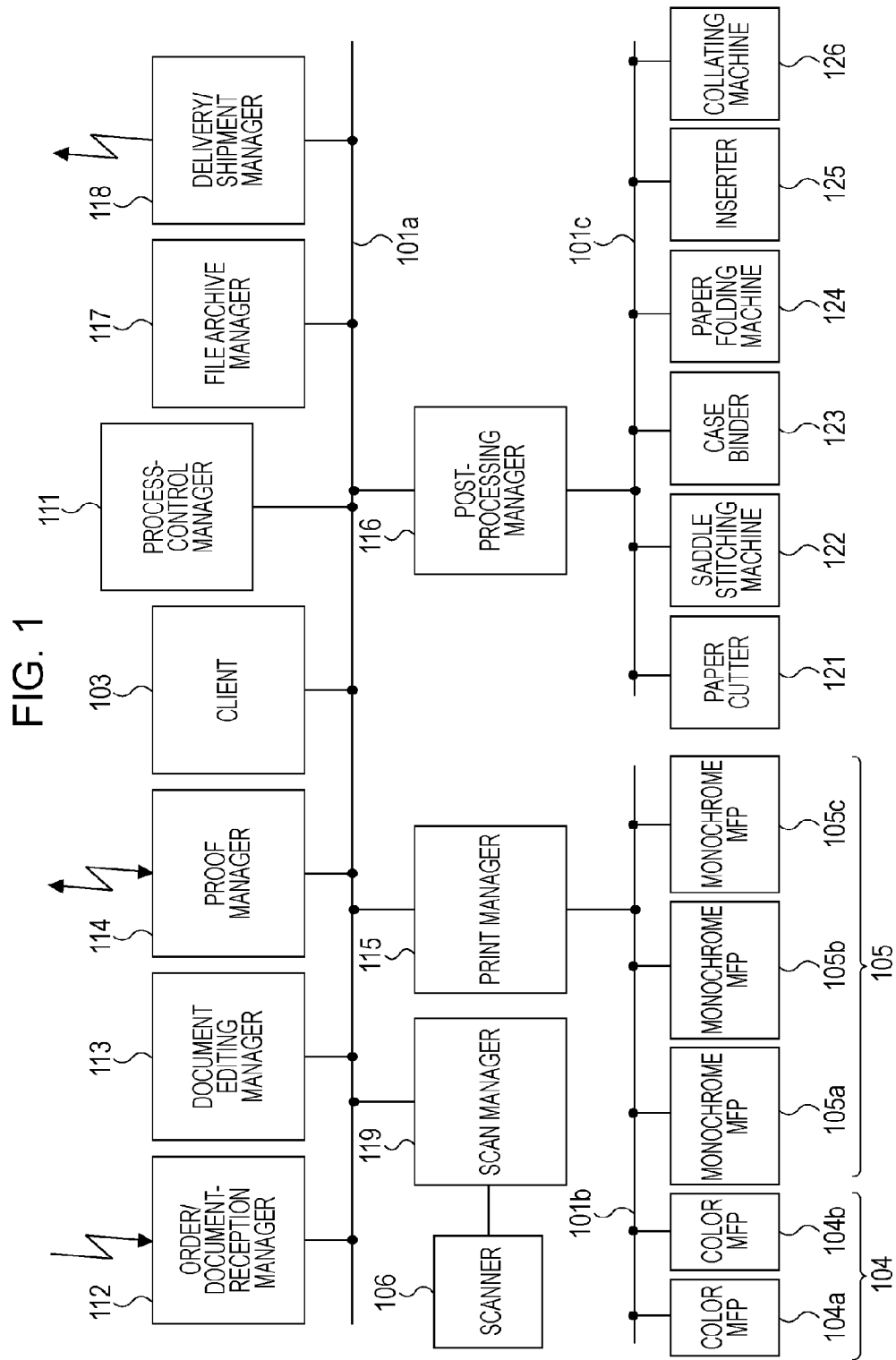

FIG. 5A

```
<?xml version="1.0" encoding="UTF-8"?>
 <PPML>
  <PAGE_DESIGN TrimBox="0 0 594.96 841.92" />
  <JOB>
    <REUSABLE_OBJECT>                                    501
      <OCCURRENCE Name="JOB" Weight="100">
    </REUSABLE_OBJECT>
  <DOCUMENT_SET>
  <DOCUMENT>
   <PAGE>
     <REUSABLE_OBJECT>                                   502
       <OCCURRENCE Name="PAGE1" Weight="100">
     </REUSABLE_OBJECT>
     <PAGE_DESIGN TrimBox="0 0 594.96 841.92" />
     <MARK Position="367.75 -153">                       503
       <OCCURRENCE_REF Ref="PAGE1" />
     </MARK>
   </PAGE>
   <PAGE>
     <REUSABLE_OBJECT>                                   504
       <OCCURRENCE Name="PAGE2" Weight="100">
     </REUSABLE_OBJECT>
     <PAGE_DESIGN TrimBox="0 0 594.96 841.92" />
     <MARK Position="367.75 -153">                       505
       <OCCURRENCE_REF Ref="PAGE2" />
     </MARK>
   </PAGE>
  </DOCUMENT_SET>
  </DOCUMENT>
 </JOB>
```

FIG. 5C

```
<?xml version="1.0" encoding="UTF-8"?>
<PPML>
<PAGE_DESIGN TrimBox="0 0 594.96 841.92" />
<JOB>
<PAGE>
    <REUSABLE_OBJECT>
      <OBJECT Position="0 0">
        <SOURCE Format="application/pdf" Dimensions="594.96 841.92">
          <EXTERNAL_DATA_ARRAY Src="format.pdf" Index="1" />
        </SOURCE>
        <VIEW />
      </OBJECT>                                                            ~509
    </REUSABLE_OBJECT>
    <PAGE_DESIGN TrimBox="0 0 594.96 841.92" />
    <MARK Position="367.75 -153">
      <OCCURRENCE_REF Ref="TEM1_16770216" />                               ~510
    </MARK>
    <PAGE_DESIGN TrimBox=" 0 0 594.96 841.92 " />
    <MARK Position="435.66 446">
      <OCCURRENCE_REF Ref="TEM1_16770216" />                               ~511
    </MARK>
</PAGE>
    :
    :
</JOB>
```

EDITING SPECIFICATION : BOUND ON RIGHT ⋯   ~500

FIG. 6A

```
<?xml version="1.0" encoding="UTF-8"?>
<PPML>
<PAGE_DESIGN TrimBox="0 0 594.96 841.92" />
<JOB>
 <PAGE>
    <REUSABLE_OBJECT>                                           ─ 601
        <EXTERNAL_DATA_ARRAY Src="UNTITLED.pdf" Index="1" />
    </OBJECT>
    <MARK Position="367.75 -153">                               ─ 602
        <OCCURRENCE_REF Ref="TM1_16770216" />
    </MARK>
 </PAGE>
 <PAGE>
    <REUSABLE_OBJECT>                                           ─ 603
        <EXTERNAL_DATA_ARRAY Src="UNTITLED.pdf" Index="1" />
    </OBJECT>
    <MARK Position="367.75 -153">                               ─ 604
        <OCCURRENCE_REF Ref="TM1_16770216" />
    </MARK>
 </PAGE>
 <PAGE>
    <REUSABLE_OBJECT>                                           ─ 605
        <EXTERNAL_DATA_ARRAY Src="UNTITLED.pdf" Index="1" />
    </OBJECT>
    <MARK Position="367.75 -153">                               ─ 606
        <OCCURRENCE_REF Ref="TM1_16770216" />
    </MARK>
 </PAGE>
</JOB>
```

FIG. 6B

```
<PPML>
 <PAGE_DESIGN TrimBox="0 0 594.96 841.92" />
 <JOB>
    <REUSABLE_OBJECT>                                              ~607
        <EXTERNAL_DATA_ARRAY Src="UNTITLED.pdf" Index="1" />
    </OBJECT>
  <PAGE>
    <MARK Position="367.75 -153">                                  ~608
        <OCCURRENCE_REF Ref="TM1_16770216" />
    </MARK>
  </PAGE>
  <PAGE>
    <MARK Position="367.75 -153">                                  ~609
        <OCCURRENCE_REF Ref="TM1_16770216" />
    </MARK>
  </PAGE>
  <PAGE>
    <MARK Position="367.75 -153">                                  ~610
        <OCCURRENCE_REF Ref="TM1_16770216" />
    </MARK>
  </PAGE>
 </JOB>
```

FIG. 12
PRIOR ART

| [600 dpi 8 bit K-CONTONE] | |
|---|---|
| MAXIMUM : 13×19 | 600×600×13×19/8×8=<br>88920000 ≈ 84.8 [Mbyte] |
| A3 : 11×17 | 600×600×11×17/8×8=<br>67320000 ≈ 64.2 [Mbyte] |
| Letter : 8.5×11 | 600×600×8.5×11/8×8=<br>33660000 ≈ 32.1 [Mbyte] |
| [600 dpi 8 bit CMYK-CONTONE] | |
| MAXIMUM : 13×19 | 600×600×13×19/8×8×4=<br>355680000 ≈ 339.2 [Mbyte] |
| A3 : 11×17 | 600×600×11×17/8×8×4=<br>269280000 ≈ 256.8 [Mbyte] |
| Letter : 8.5×11 | 600×600×8.5×11/8×8×4=<br>134640000 ≈ 128.4 [Mbyte] |
| [1200 dpi 8 bit K-CONTONE] | |
| MAXIMUM : 13×19 | 1200×1200×13×19/8×8=<br>355680000 ≈ 339.2 [Mbyte] |
| A3 : 11×17 | 1200×1200×11×17/8×8=<br>269280000 ≈ 256.8 [Mbyte] |
| Letter : 8.5×11 | 1200×1200×8.5×11/8×8=<br>134640000 ≈ 128.4 [Mbyte] |
| [1200 dpi 8 bit CMYK-CONTONE] | |
| MAXIMUM : 13×19 | 1200×1200×13×19/8×8×4=<br>1422720000 ≈ 1356.8 [Mbyte] |
| A3 : 11×17 | 1200×1200×11×17/8×8×4=<br>1077120000 ≈ 1027.2 [Mbyte] |
| Letter : 8.5×11 | 1200×1200×8.5×11/8×8×4=<br>538560000 ≈ 513.6 [Mbyte] |

PRINT-DATA PROCESSING APPARATUS AND PRINT-DATA PROCESSING METHOD

BACKGROUND OF THE INVENTION

1. Field of the Invention

The present invention relates to a print-data processing apparatus and a print-data processing method for processing print data.

2. Description of the Related Art

As one-to-one marketing has expanded in recent years, direct mail for providing information according to individual customers' needs has been widely employed. To print such variable jobs, page description languages (PDLs) such as Personalized Print Markup Language (PPML, which is a registered trademark of Print on Demand Initiative Incorporated), Variable-data Intelligence PostScript Printware (VIPP, which is a registered trademark of Xerox Corporation), Variable Print Specification (VPS), and FreeForm are employed. These page description languages are configured to include many pieces of variable data including customer information and reusable data that can be repeatedly used on multiple pages.

For example, when PPML data is used as print data, there is a characteristic specification that reusable data can be referred to a multiple number of times within a defined range. Therefore, in a print-data processing apparatus such as a print controller for analyzing print data, a reusable object is cached as analyzed image data. The cached image data is combined with the foregoing variable data in the print-data processing apparatus, and the generated image data is printed. This print technique is described in, for example, Japanese Patent Laid-Open No. 2001-199105.

However, with the foregoing technique in the related art, cached image data generated by analyzing a reusable object may be high-resolution color image data. FIG. 12 shows specific examples of the capacity of cached image data.

Referring to FIG. 12, high-resolution (dpi) data, color (CMYK) data, and image data of a large sheet size tend to significantly increase in data size.

In this manner, the data size of image data obtained by analyzing a reusable object increases. In this case, stress is placed on a memory in a print-data processing apparatus, resulting in a decrease in the operation performance of the print-data processing apparatus or incapability of the print-data processing apparatus to print the print data. Furthermore, when, for example, a reusable object is raster-image processed (hereinafter referred to as RIP-processed) to generate an image immediately after analysis of print data begins and the image is deleted after printing based on the print data is completed, stress is placed on the memory for a long time.

SUMMARY OF THE INVENTION

The present invention provides techniques to eliminate failures, such as a reduction in the operation performance of a print-data processing apparatus when processing print data in which a reusable object is defined or incapability of the print-data processing apparatus to print the print data.

According to an aspect of the present invention, a print-data processing apparatus includes an input unit configured to receive an input of print data in which a reusable object whose range of use is specified is defined, and a control unit configured to perform a control operation to change the range of use of the reusable object according to a page layout defined by a print setting of the print data.

Further features of the present invention will become apparent from the following description of exemplary embodiments with reference to the attached drawings.

BRIEF DESCRIPTION OF THE DRAWINGS

FIG. 1 is a block diagram of an exemplary schematic structure of an image forming system according to a first embodiment of the present invention.

FIG. 5A is a schematic diagram of an exemplary data structure in the PPML format, which is a typical example of input data according to the first embodiment.

FIG. 5C is a schematic diagram of an exemplary data structure of output data output in response to the input data shown in FIG. 5B according to the first embodiment.

FIG. 6A is a schematic diagram of an exemplary data structure of input data according to the first embodiment.

FIG. 6B is a schematic diagram of an exemplary data structure of output data output in response to the input data shown in FIG. 6A according to the first embodiment.

FIG. 12 illustrates examples of the capacity of cached image data.

DESCRIPTION OF THE EMBODIMENTS

Figure 2A:
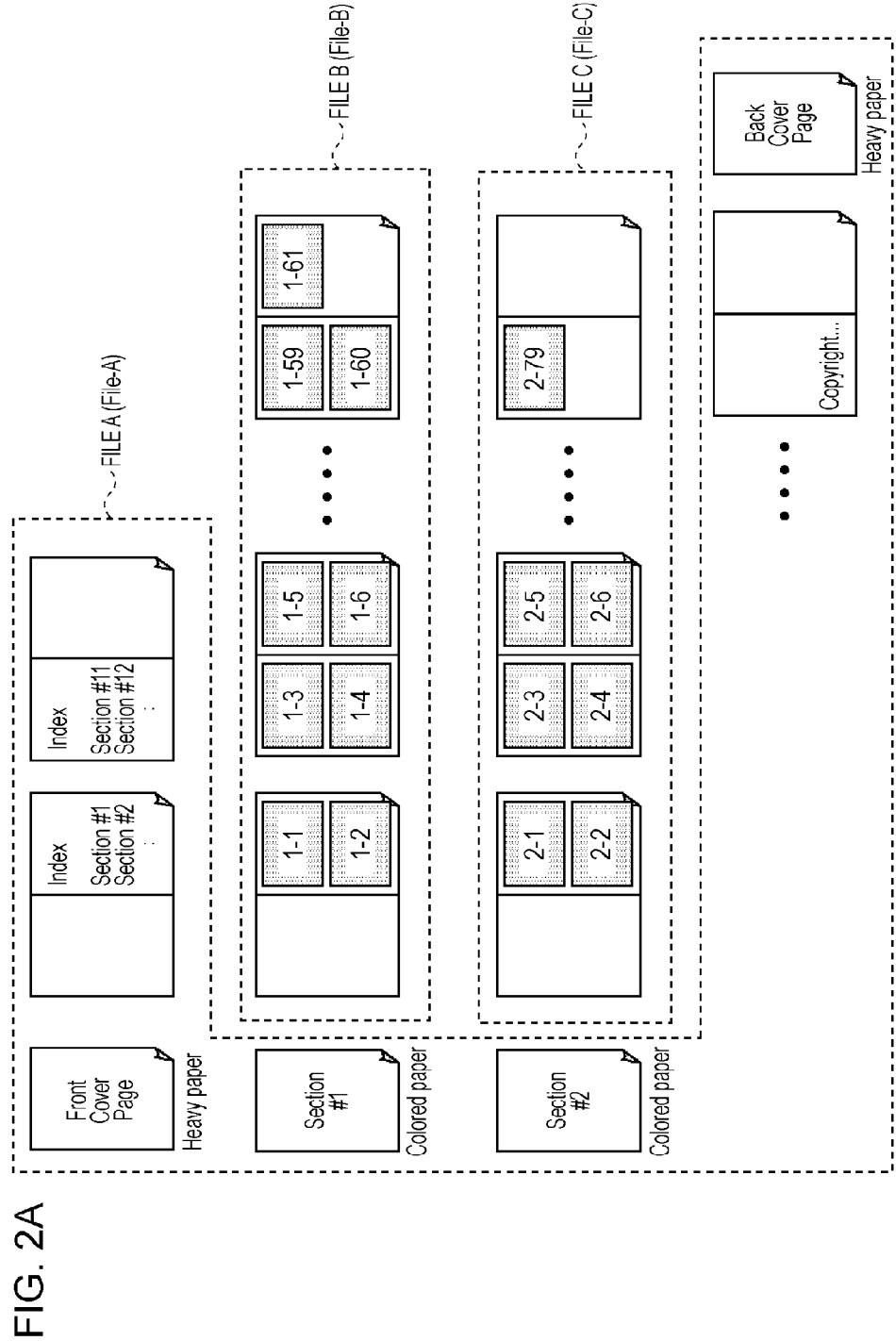
FIG. 2A is a schematic diagram illustrating files A to C sent from a user (client) and exemplary finished (edited) images of the files A to C.

Exemplary embodiments of the present invention will be described below with reference to the accompanying drawings.

FIG. 1 is a block diagram of an exemplary schematic structure of an image forming system according to a first exemplary embodiment.

Referring to FIG. 1, devices constituting the image forming system according to the present embodiment are interconnected by networks 101a to 101c. Although the devices shown in the example of FIG. 1 are interconnected by the plural networks 101a to 101c, the devices may be interconnected by a single network.

The image forming system includes multifunctional devices (MFPs), such as a color MFP 104 and a monochrome MFP 105, having a plurality of functions to print electronic data supplied from a scanner unit or an external device, such as a computer. Driving of the color MFP 104 and the monochrome MFP 105 is controlled by a print manager 115 via the network 101b. With continued reference to FIG. 1, for example, the image forming system includes two color MFPs 104a and 104b serving as the color MFP 104 and three monochrome MFPs 105a, 105b, and 105c serving as the monochrome MFP 105.

The image forming system further includes devices with a single function, including a device with a scanner function, such as a scanner 106, and a device with a print function (not shown). Driving of the scanner 106 is controlled by a scan manager 119.

The image forming system includes various sheet processing devices that can process sheets (recording paper) printed by the color MFP 104 and the monochrome MFP 105. In this case, sheet processing corresponds to at least one of multiple types of post-processing including cutting, stapling, folding, binding such as saddle stitching and case binding, inserting, and collating of printed recording sheets.

The image forming system includes, as exemplary sheet processing devices, a paper cutter 121, a saddle stitching machine 122, a case binder 123, a paper folding machine 124, an inserter 125, and a collating machine 126. Driving of these sheet processing devices is controlled by a post-processing manager 116 via the network 101c.

The paper cutter 121 cuts the printed recording sheets with respect to a predetermined portion(s) of the recording sheets (for example, the right edge of the recording sheets, three edges including the top, right, and bottom edges of the recording sheets, or the center of the recording sheets). The saddle stitching machine 122 performs saddle stitching involving stapling of the printed recording sheets at the center of the recording sheets, and thereafter, folding of the recording sheets in half at the center.

The case binder 123 performs case binding involving alignment of the printed recording sheets, applying adhesive to the spine of a block of the aligned sheets, fitting the block into its cover, and pressing the covered block in a press. The paper folding machine 124 folds the printed recording sheets.

The inserter 125 performs insertion by enclosing the recording sheets printed by the color MFP 104 or the monochrome MFP 105 and processed by the other sheet processing devices with a predetermined container, such as an envelope. Containers used by the inserter 125 are very useful for delivering the printed, processed recording sheets to customers. The collating machine 126 performs collation of the printed recording sheets (arranging the recording sheets in an appropriate sequence of pages).

In the image forming system, multiple types of sheet processing can be executed by the respective sheet processing device 121 to 126. However, the present embodiment is not limited to such a device structure. For example, one sheet processing device may be configured to perform a plurality of types of sheet processing including stapling, binding, and folding. Alternatively, one sheet processing device may be configured to perform one type of sheet processing. Any device structure is applicable to the present embodiment as long as the device structure can perform sheet processing as desired by a user (customer).

As described above, the image forming system of the present embodiment includes plural types of devices including the image forming devices 104 and 105 and the sheet processing devices 121 to 126. These devices have communication units and are configured to exchange data (image data, print condition data, control data, status create data, status data, and the like) with one another via the networks 101a to 101c serving as communication media.

The image forming system shown in FIG. 1 further includes a client 103, a process-control manager 111, an order/document-reception manager 112, a document editing manager 113, and a proof manager 114, a file archive manager 117, and a delivery/shipment manager 118. The client 103 and the managers 111 to 119 are interconnected via the network 101a.

The managers 111 to 119 may be individual, separate information processing apparatuses (for example, host computers and servers). Alternatively, some or all of the functions of the managers 111 to 119 may be realized by a single information processing apparatus.

For example, a single host computer or server capable of executing all the functions of the managers 111 to 119 may be applied to the image forming system. Alternatively, a plurality of host computers or servers, each of which is capable of executing some of the functions of the managers 111 to 119, may be configured and applied to the image forming system. That is, any device structure is applicable as long as various types of control operations described in the present embodiment can be performed.

Figure 11:
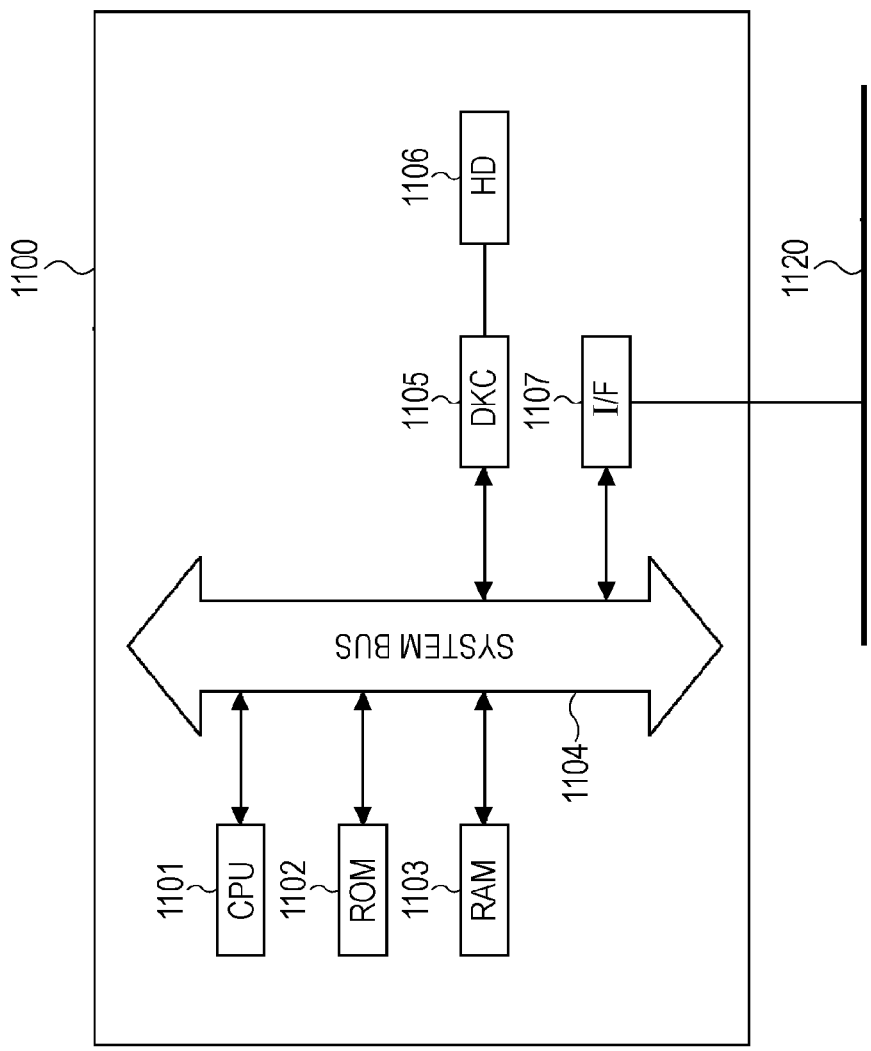
FIG. 11 is a block diagram of an exemplary structure of a computer.

The managers 111 to 119 are configured by, for example, a computer 1100 shown in FIG. 11. The computer 1100 includes a central processing unit (CPU) 1101, a read-only memory (ROM) 1102, a random-access memory (RAM) 1103, a system bus 1104, a disk controller (DKC) 1105, a hard disk (HD) 1106, and an interface (I/F) 1107.

The CPU 1101 executes a control program stored in the ROM 1102 or the HD 1106 and controls all the devices connected to the system bus 1104. The RAM 1103 functions as a main memory, a work area, etc. of the CPU 1101.

The DKC 1105 controls access to the HD 1106 storing a boot program, a plurality of applications, editing files, user files, a network management program, etc. The boot program refers to an activation program for starting execution (operation) of hardware and software in the computer 1100. The I/F 1107 performs bidirectional data exchange with an external device via a local area network (LAN) 1120 (the network 101a in the structure shown in FIG. 1).

The client (client computer) 103 shown in FIG. 1 is configured to be capable of accessing the managers 111 to 119. For example, the client 103 sends image data to be printed, together with print output condition data of that image data, to the order/document-reception manager 112. In order to check the finishing of a document requested by a user to be printed, the client 103 receives image data of the edited document from the proof manager 114. In order to receive a notification of completion of printing, the client 103 receives printing completion notification information from the delivery/shipment manager 118. In this case, the client 103 is enabled to set various print settings entered by a user via a user interface (UI), such as a display of the client 103, and to check the image, etc.

An example in which a print-data processing apparatus according to the present embodiment is applied to the document editing manager 113 shown in FIG. 1 will now be described.

The document editing manager 113 shown in FIG. 1 merges a plurality of files sent from the user regarding a job to be managed as a document editing job in the process-control manager 111. The document editing manager 113 inserts/deletes pages, arranges the pages according to a layout specified by the user, or visualizes in advance the result of post-processing required by the user.

The document editing manager 113 handles jobs as, for example, electronic data. For example, the document editing manager 113 displays to the user the processing format of images to be printed on recording sheets before causing the image forming device (color MFP 104 or the monochrome MFP 105) to actually execute printing on the recording sheet (at a pre-processing stage). Also, the document editing manager 113 displays to the user the manner in which the printed recording sheets are to be processed before causing the sheet processing devices 121 to 126 to actually execute sheet processing of the printed recording sheets. These display operations are performed by sending, for example, various types of information and data from the CPU 1101 of the document editing manager 113 to the client 103 via the I/F 1107 and displaying the information and data on a display of the client 103.

The document editing manager 113 performs a control operation to cause the display of the client 103 to display as a preview the edited image data generated by editing document image data. The document editing manager 113 performs a control operation to display, on the display of the client 103, display image data such as a thumbnail indicating a state in which the edited image data is printed on recording sheets. Furthermore, the document editing manager 113 performs a control operation to display, on the display of the client 103, display image data such as a thumbnail to enable the user to check how the recording sheets on which the edited image data has been printed are to be processed.

Figure 2B:
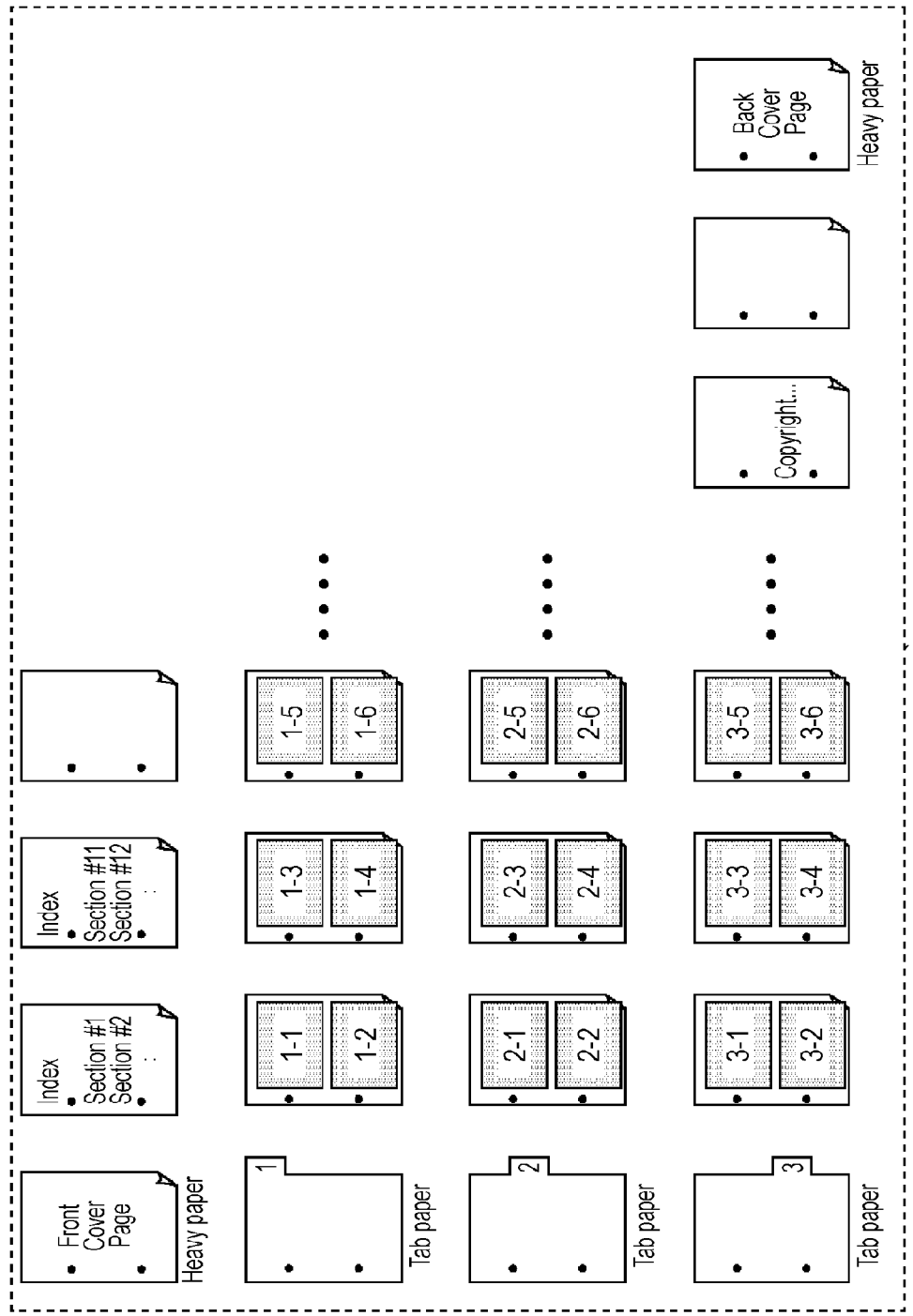
FIG. 2B is a schematic diagram illustrating a file D sent from the user (client) and exemplary finished (edited) images of the file D.
Figure 2C:
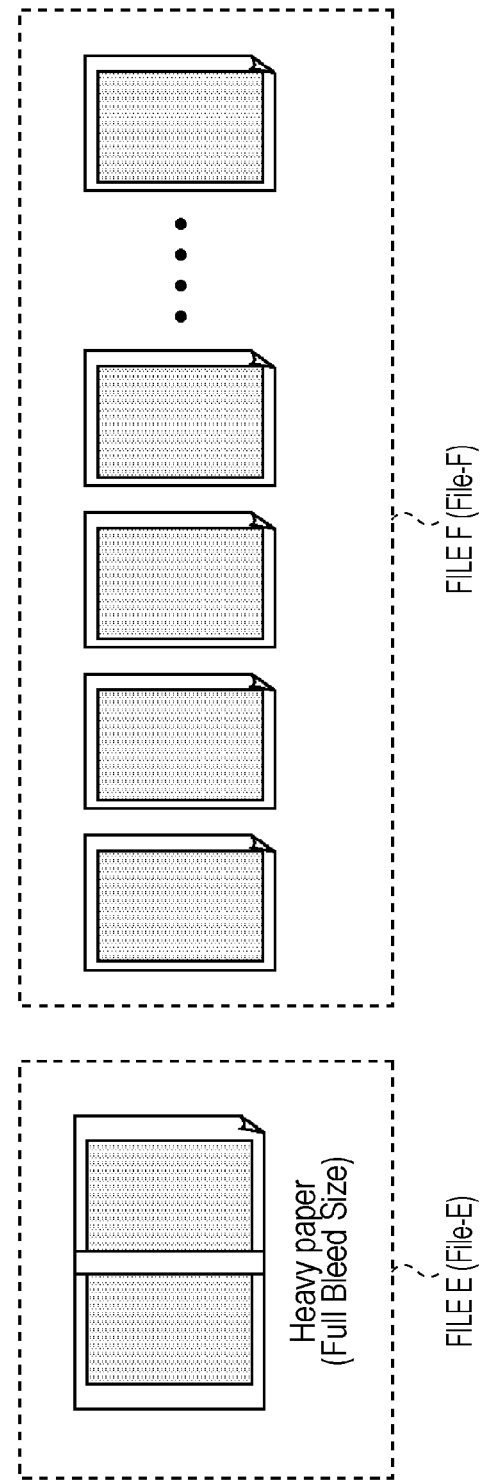
FIG. 2C is a schematic diagram illustrating files E and F sent from the user (client) and exemplary finished (edited) images of the files E and F.

FIGS. 2A to 2C are schematic diagrams of files A to F sent from the user (client 103) and exemplary finished (edited) images thereof. More specifically, FIG. 2A is a schematic diagram of the files A to C, FIG. 2B is a schematic diagram of the file D, and FIG. 2C is a schematic diagram of the files E and F.

In the example shown in FIG. 2A, a job received from the user (client 103) includes file A (File-A), file B (File-B), and file C (File-C). The file A is requested by the user to be output at the original size, and the files B and C are requested by the user to be output as "2 in 1". That is, "2 in 1" is a mode in which printing of a plurality of pieces of document image data for two pages arranged and formed on one side of one page of recording paper is performed.

In such a case, information indicating the output size is necessary when editing the document. Therefore, the user is required to specify information indicating the output size via the client 103. When it is necessary to take into consideration the output sequence, the user is required to specify information indicating the output sequence via the client 103 when inputting the document.

In the example shown in FIG. 2B, a job input by the user includes one file, that is, file D (File-D). The file D is requested by the user to be printed on a specific medium, such as tab paper, etc. Furthermore, post-processing (sheet processing) including punching of the recording sheets on which the job has been printed using a sheet processing device that can perform punching is requested. In this manner, even in the case where only one file is input, if the user requests to output the file to a specific medium such as tab paper and to perform post-processing such as punching, the user is required to specify medium information indicating tab paper and post-processing information indicating punching when inputting the document.

In the example shown in FIG. 2C, a job input from the user includes file E (File-E) and file F (File-F). The files E and F are requested by the user to be case-bound. However, the files E and F have different paper sizes to be used. In this manner, when the paper size is different for each file, the user is required to specify, when inputting the document, information indicating a paper size to be used to output the document when editing the document.

Various types of information specified by the user as has been described above are entered on a UI screen of the document editing manager 113 or the print manager 115 shown in FIG. 1.

Figure 3A:
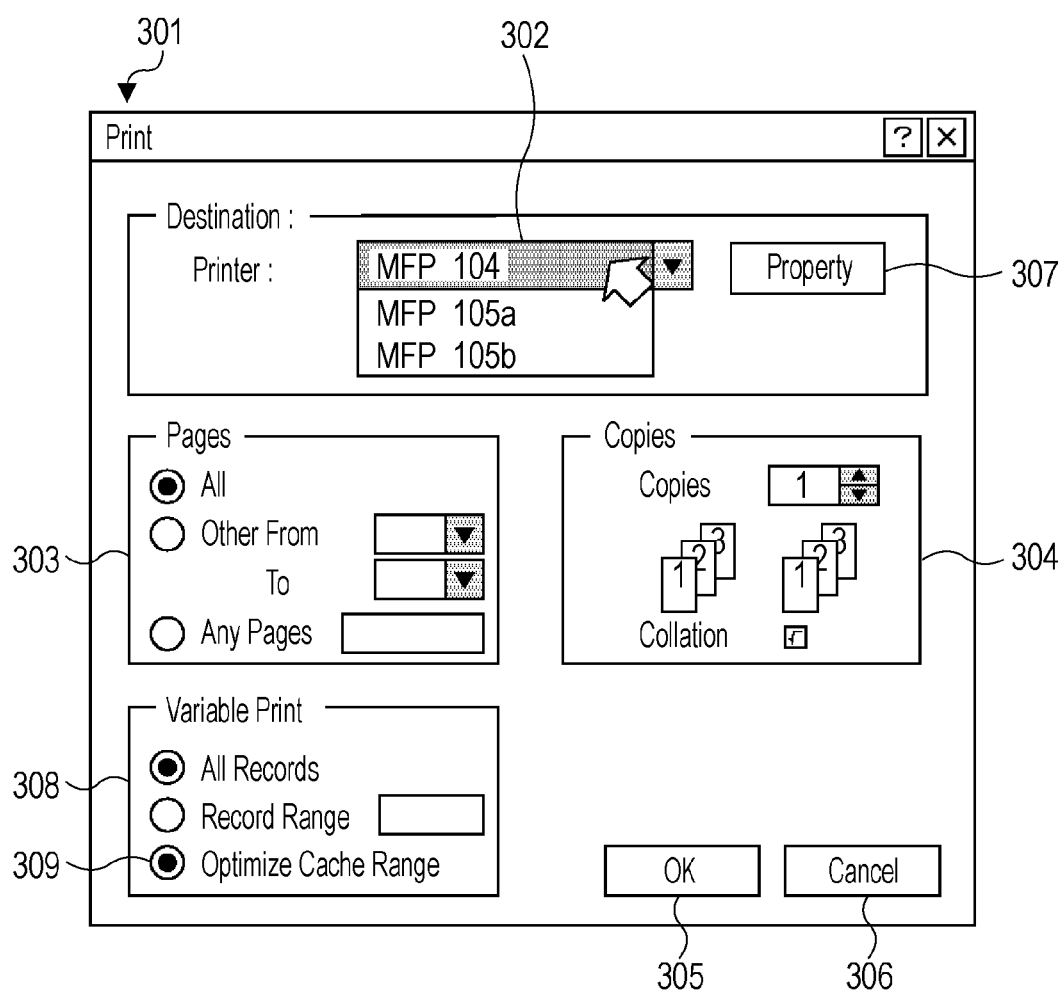
FIG. 3A is a schematic diagram illustrating a window display screen of a printer driver activated by a document editing manager.

FIG. 3A is a schematic diagram of a window display screen 301 of a printer driver activated by the document editing manager 113. The window display screen 301 is displayed, for example, by the document editing manager 113 on the display of the client 103. Settings are entered on the window display screen 301 via, for example, the print manager 115 under control of the document editing manager 113.

Among setting items in the window display screen 301 of the printer driver, the user selects an output destination device serving as a target via an output destination selecting column 302. In the present embodiment, the foregoing color MFP 104 or the monochrome MFP 105 is selected.

A page setting column 303 is used to select output pages from the job. In the page setting column 303, the pages of image data generated by application software running on the client 103 to be output is determined. In the page setting column 303, the user can select pages to be printed and output using the color MFP 104 or the monochrome MFP 105 in the image forming system according to the present embodiment. In this case, for example, all pages can be printed. Alternatively, instead of printing all the pages, only specific pages can be printed.

A number-of-copy setting column 304 is used to specify the number of output copies of the job to be printed and output using the color MFP 104 or the monochrome MFP 105 of the image forming system according to the present embodiment. In this case, the number of copies can be increased or decreased by moving a cursor to the number-of-copy setting column 304 and clicking on the arrows (↑ and ↓) of a scroll bar.

A property key 307 is used to enter detailed settings of the output destination device selected in the output destination selecting column 302. A control operation is performed in response to detailed settings entered by the user using the property key 307. A variable print setting column 308 is used to enter settings of variable printing. According to the present embodiment, a setting to optimize print data in variable-job printing can be entered by pressing (selecting) an "optimize cache range" key 309 in the variable print setting column 308.

When the user enters various settings and specifies an OK key 305, printing in accordance with the current settings begins. When the OK key 305 is pressed by the user on the window display screen 301, the client 103 sends print data to the print manager 115. In contrast, the processing set on the window display screen 301 can be cancelled by the user by pressing a Cancel key 306. In this case, the printing is cancelled, and the displaying of information on the window display screen 301 is terminated.

Figure 3B:
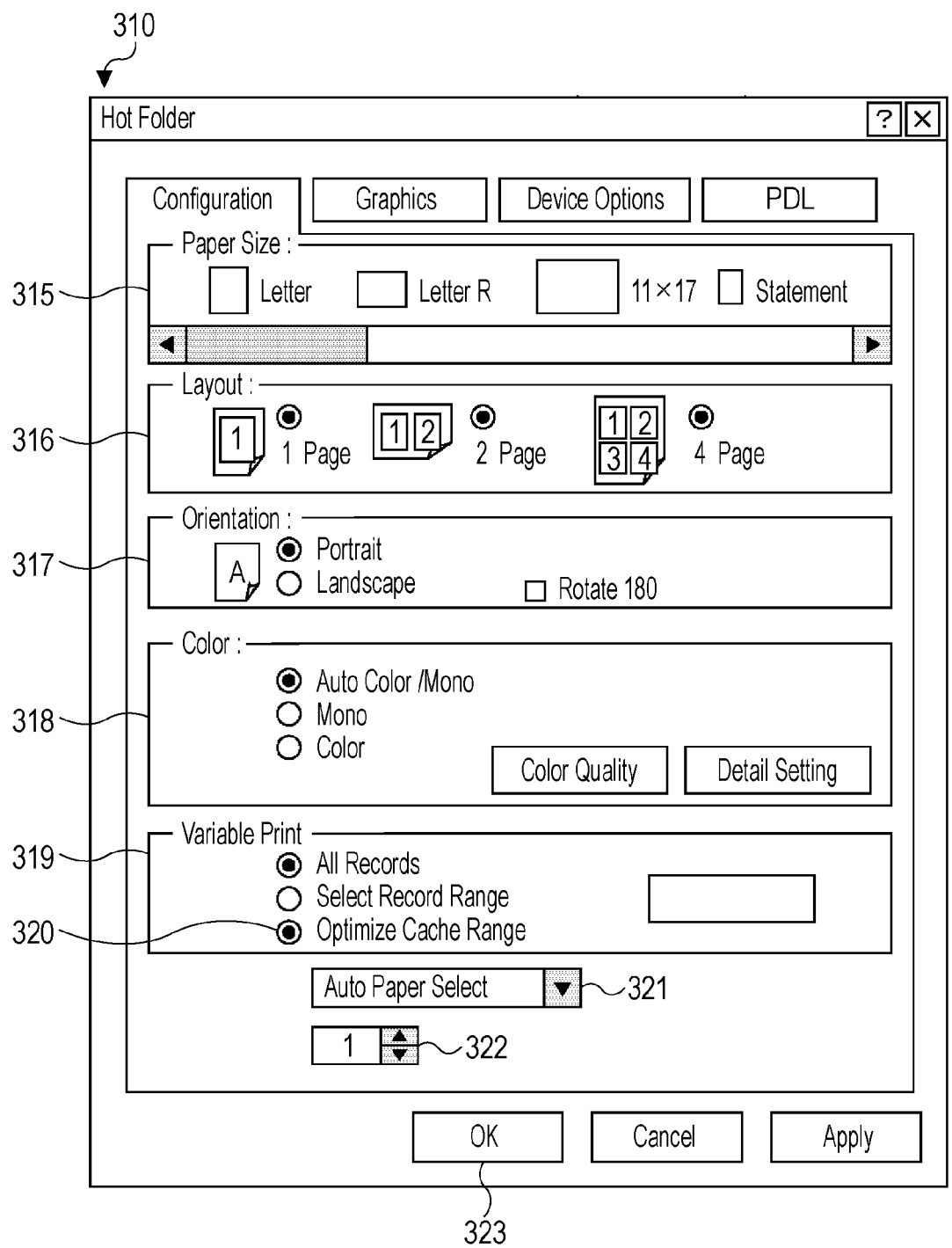
FIG. 3B is a schematic diagram illustrating a window display screen of a hot folder playing the role to receive an input job.

FIG. 3B is a schematic diagram of a window display screen 310 of a hot folder playing the role to receive an input job. The window display screen 310 is displayed, for example, by the document editing manager 113 on the display of the client 103. Settings to, for example, the color MFP 104 or the monochrome MFP 105 are entered on the window display screen 310 via the print manager 115 under control of the document editing manager 113.

Among setting items in the window display screen 310 of the hot folder, a paper-size setting column 315 is used to set the size of pages output from the job. More specifically, in the paper-size setting column 315, the paper size used to output image data generated by application software running on the client 103 is determined.

A page-layout setting column 316 is used to specify the page layout of the output pages. An orientation setting column 317 is used to set the direction of the output pages. A color setting column 318 is used to set the color for outputting the print data. With this setting, to use the color MFP 104 or the monochrome MFP 105 for printing the print data is determined.

A variable print setting column 319 is used to enter settings of variable printing. According to the present embodiment, a setting to optimize print data in variable-job printing can be entered by pressing (selecting) an "optimize cache range" key 320 in the variable print setting column 319.

A tray selecting column 321 is used to select a tray from which the paper on which printing is to be performed is obtained. A number-of-copy setting column 322 is used to specify the number of output copies of the print job. In this case, the number of copies can be increased or decreased by moving a cursor to the number-of-copy setting column 322 and clicking on the arrows (↑ and ↓) of a scroll bar.

When the user enters various settings and specifies an OK key 323, printing in accordance with the current settings begins.

Figure 4:
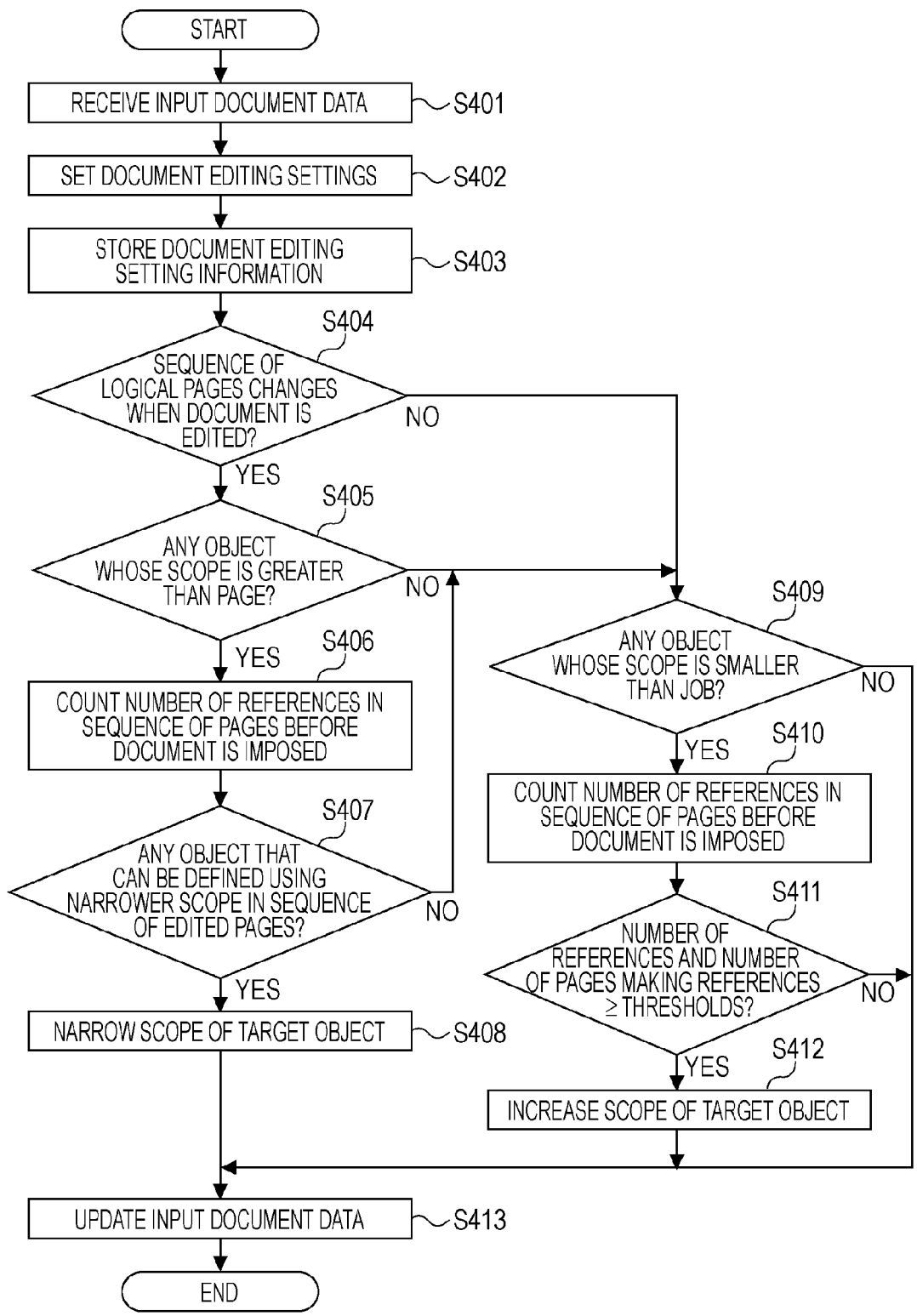
FIG. 4 is a flowchart of an internal process performed by the document editing manager according to the first embodiment.

FIG. 4 is a flowchart of an internal process performed by the document editing manager 113 according to the present embodiment. In this case, the process of the flowchart shown in FIG. 4 is performed by, for example, the CPU 1101 of the document editing manager 113.

In step S401, the CPU 1101 receives an input of document data output from the order/document-reception manager 112. The input document data relates to print data in which a reusable object whose applicable range of reuse (hereinafter referred to as "scope" as needed) is specified is defined.

In step S402, the CPU 1101 sets document editing settings in a desired format of the input document data specified by the user via the client 103.

In step S403, the CPU 1101 stores setting information regarding the document editing set in step S402 in a storage unit, such as the RAM 1103. Alternatively, the CPU 1101 may store the setting information regarding the document editing in the HD 1106 via the DKC 1105.

In step S404, the CPU 1101 determines whether the sequence of logical pages is to be changed when the document is edited, based on the setting information regarding the document editing, which is stored in step S403. In this case, for example, whether the sequence of logical pages is to be changed is determined based on the page layout information specified in the page-layout setting column 316 of the hot folder shown in FIG. 3B.

When the determination in step S404 shows that the sequence of logical pages is to be changed when the document is edited, the flow proceeds to step S405. In step S405, the CPU 1101 determines whether there is a reusable object (or may be simply referred to as an object) whose scope is greater than a page. More specifically, the CPU 1101 determines whether there is a reusable object whose scope is a job, a document, a document setting, etc. Ranges greater than a page are called first ranges. Ranges narrower than a page are called second ranges.

When the determination in step S405 shows that there is an object whose scope is greater than the page that has been set, the flow proceeds to step S406. In step S406, the CPU 1101 counts the number of references made to the object by each page, document, and job in the sequence of pages before the document is imposed and stores the count value in the RAM 1103 (or in the HD 1106 via the DKC 1105). In this case, the CPU 1101 may additionally store data indicating which page refers to the reusable object. For example, given print data including first to eighth pages, if the first page and the eighth page refer to the reusable object, the CPU 1101 determines that the number of references made to the reusable object is two, and the reference sources are the first and eighth pages.

In step S407, the CPU 1101 determines, in the sequence of pages of the edited document, whether there is an object that can be defined using a narrower scope.

The processing in step S407 will now be described in more detail.

It is assumed, for example, that print data including first to eighth logical pages is received, and this print data is specified to be printed and bound as a book by folding a block of plural sheets in half and binding the folded sheets together. It is also assumed that the print data includes a reusable object whose scope is a job, and the first and eighth pages refer to the reusable object.

When the CPU 1101 arranges the print data for bookbinding and printing, the first page and the eighth page are arranged on one side of one sheet. Thus, based on the edited pages, the number of references made to the reusable object is changed from two to one. In this manner, if the number of references determined based on the edited pages is less than the number of references determined based on the logical pages, the CPU 1101 determines "yes" in step S407.

When the determination in step S407 shows that there is an object that can be defined using a narrower scope, the CPU 1101 narrows the scope of the target object in step S408. This processing corresponds to changing "JOB" which serves as the scope of a reusable object 506 shown in FIG. 5B, which is described below, to "PAGE" which serves as the scope of a reusable object 509 shown in FIG. 5C.

When the determination in step S404 shows that the sequence of logical pages is not changed when the document is edited, or when the determination in step S405 shows that there is no object whose scope is greater than the page that has been set, the flow proceeds to step S409. Alternatively, when the determination in step S407 shows that there is no object that can be defined using a narrower scope, the flow proceeds to step S409.

In step S409, the CPU 1101 determines whether there is an object whose scope is smaller than a job.

When the determination in step S409 shows that there is an object whose scope is smaller than a job, the flow proceeds to step S410. In step S410, the CPU 1101 counts the number of references made to the object by each page, document, and job in the sequence of pages before the document is imposed and stores the count value. In this case, the CPU 1101 of the document editing manager 113 stores the count value of the references according to the sequence of pages before the document is imposed in, for example, the RAM 1103. Alternatively, the CPU 1101 may store the count value of the references according to the sequence of pages before the document is imposed in the HD 1106 via the DKC 1105.

In step S411, the CPU 1101 determines whether the number of references and the number of pages making the references are greater than or equal to threshold values.

When the determination in step S411 shows that the number of references and the number of pages making the references are greater than or equal to the threshold values, the CPU 1101 increases the scope of the target object in step S412.

After the processing in step S408 or S412 is completed, or when the determination in step S409 shows that there is no object whose scope is smaller than a job, the flow proceeds to step S413. Alternatively, when the determination in step S411 shows that the number of references and the number of pages making the references are less than the threshold values, the flow proceeds to step S413.

In step S413, the CPU 1101 updates the document data received in step S401, and the process is completed.

Using FIGS. 5A to 5C, 6A, and 6B, document data (input data) received by the document editing manager 113 and output data obtained by editing the document using the document editing manager 113 will be described.

FIG. 5A is a schematic diagram of an exemplary data structure in the PPML format, which is a typical example of input data (document data) according to the present embodiment. The input data shown in FIG. 5A is sandwiched between "<JOB>", which is a job start command, and "</JOB>", which is a job end command. Furthermore, each of reference portions (reference commands) 503 and 505 that refer to reusable objects in the input data is sandwiched between "", which is a page start command, and "</PAGE>", which is a page end command.

The input data shown in FIG. 5A has the following layers: JOB, PPML, DOCUMENT_SET, DOCUMENT, and PAGE. The input data shown in FIG. 5A includes objects defined by reusable objects (REUSABLE_OBJECT). The reusable objects can be referred to an arbitrary number of times within corresponding layers.

A reusable object 501 shown in FIG. 5A has JOB as its scope since the reusable object 501 is declared in a portion nested by the definition of JOB. Since the reusable object 501 has JOB as its scope, the reusable object 501 can be referred to an arbitrary number of times and to be specified to be rendered within the scope from <JOB> to </JOB> shown in FIG. 5A. That is, the scope of the reusable object 501 is specified by JOB.

A reusable object 502 shown in FIG. 5A is an object having "PAGE 1" (the first page) as its scope. The reusable object 502 can be referred to a plurality of times within the scope of the first page, which is a corresponding page. The reference portion 503 refers to the reusable object 502 having "PAGE 1" (the first page) as its scope. In this case, the reference portion 503 can refer to the reusable object 501 having JOB as its scope.

A reusable object 504 shown in FIG. 5A is an object having "PAGE 2" (second page) as its scope. The reusable object 504 can be referred to a plurality of times within the scope of the second page, which is a corresponding page. The reference portion 505 refers to the reusable object 504 having "PAGE 2" (the second page) as its scope. In this case, the reference portion 505 can refer to the reusable object 501 having JOB as its scope. However, the reference portion 505 cannot refer to the reusable object 502 having "PAGE 1" (the first page) as its scope.

Figure 5B:
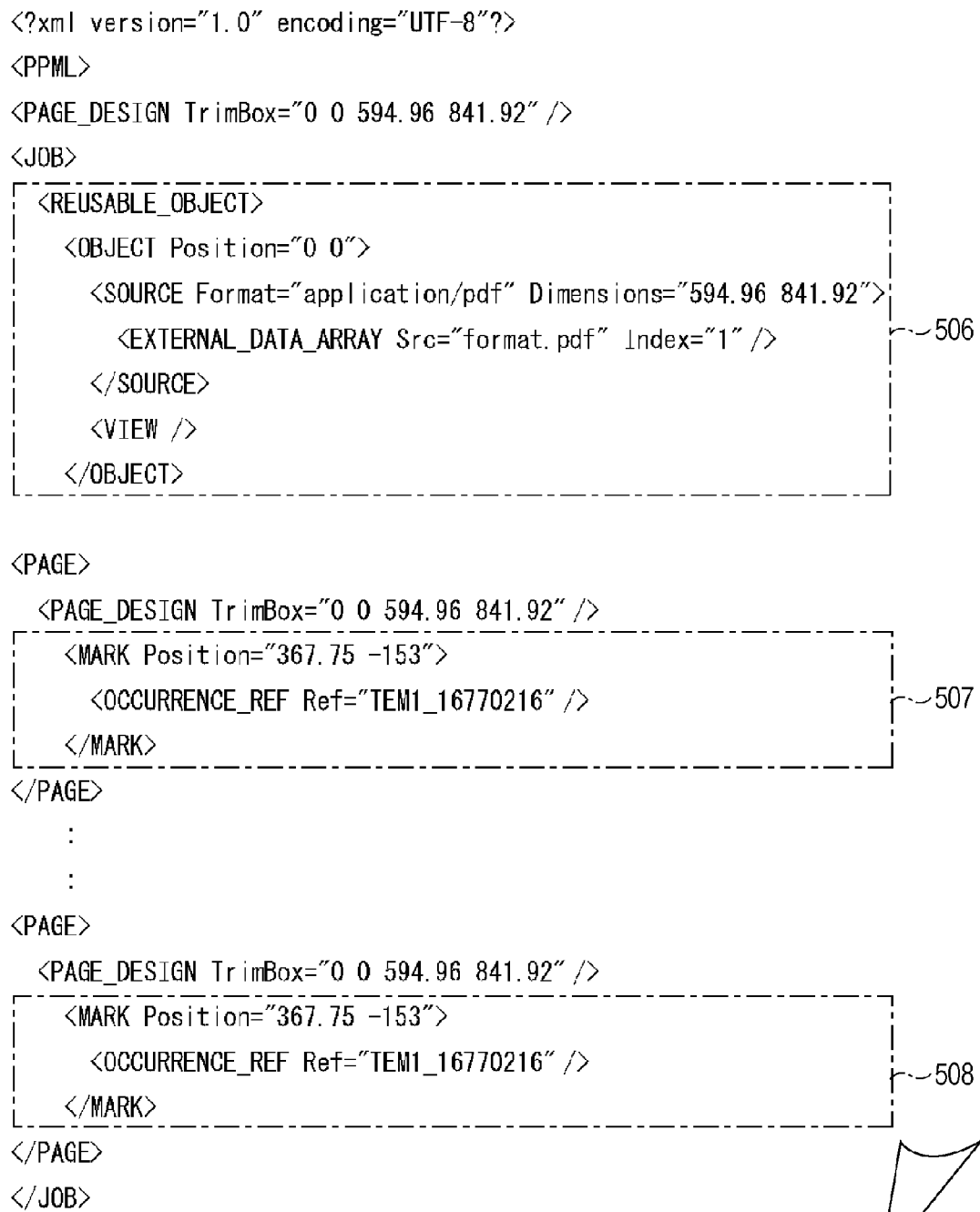
FIG. 5B is a schematic diagram of an exemplary data structure of input data according to the first embodiment.

FIG. 5B is a schematic diagram of an exemplary data structure of input data (document data) according to the present embodiment.

A reusable object 506 shown in FIG. 5B is an object having JOB as its scope. As shown in a reference portion 507, the reusable object 506 is referred to by the first page of the document and is rendered. Furthermore, as shown in a reference portion 508, the reusable object 506 is referred to by the last page of the document and is rendered. This input data has an editing specification 500 specifying the document to be edited is to be bound on the right.

When the data shown in FIG. 5B is processed, the CPU 1101 generates an image of the reusable object 506 having JOB as its scope and, after all the pages are printed, deletes the image.

FIG. 5C is a schematic diagram of an exemplary data structure of output data output in response to the input data shown in FIG. 5B according to the present embodiment.

The reusable object 506 having JOB as its scope in the input data shown in FIG. 5B is changed to a reusable object 509 defined as having PAGE as its scope in the output data shown in FIG. 5C.

This is because the first page and the last page in PDL, which is a page description language, are arranged on one page when printed, due to the document editing processing performed by the document editing manager 113. Accordingly, the scope of the reusable object is redefined and changed from JOB to PAGE. Reference portions 510 and 511 shown in FIG. 5C refer to the reusable object 509 having PAGE as its scope and specifies to render the reusable object 509.

By converting the input data shown in FIG. 5B to the output data shown in FIG. 5C, an image obtained by performing RIP processing of the reusable object 509 is RIP-processed immediately before the page on which the first page and the last page are arranged is printed. When printing of that page is completed, the image is deleted. Thus, when compared with the case where the data shown in FIG. 5B is processed, the cache period of an image of a reusable object is reduced (optimized), and the problem that stress is unnecessarily placed on the memory can be overcome.

In FIGS. 5A to 5C, the example in which the range of use is changed from JOB to PAGE has been described. Alternatively, the present embodiment is applicable to cases where the range of use is changed from, for example, DOCUMENT to PAGE, or from DOCUMENT_SET to PAGE. By generating the data shown in FIGS. 5A to 5C, the print-data processing apparatus can perform RIP processing of a reusable object at an appropriate timing simply by analyzing the data, even when the print-data processing apparatus has no special function.

FIG. 6A is a schematic diagram of an exemplary data structure of input data (document data) according to the present embodiment.

A reusable object 601 shown in FIG. 6A is an object defined as having PAGE as its scope. The reusable object 601 is referred to by a reference portion 602 and is rendered.

Similarly, reusable objects 603 and 605 shown in FIG. 6A are objects defined as having PAGE as their scopes. The reusable object 603 is referred to by a reference portion 604 and is rendered. The reusable object 605 is referred to by a reference portion 606 and is rendered.

The reusable objects 601, 603, and 605 are the same data, although the reusable objects 601, 603, and 605 are declared in different portions. In FIG. 6A, a reusable object is declared in each page. Thus, RIP processing is performed on a page-by-page basis.

FIG. 6B is a schematic diagram of an exemplary data structure of output data output in response to the input data shown in FIG. 6A according to the present embodiment.

Referring to FIG. 6B, all the reusable objects 601, 603, and 605 defined as having PAGE as their scopes in FIG. 6A are aggregated and redefined as a reusable object 607 having JOB as its scope. This processing is performed on, for example, a reusable object that has been referred to by a page a number of times greater than or equal to a threshold value. The reusable object 607 is referred to by pages in reference portions 608, 609, and 610.

Therefore, when the data shown in FIG. 6B is processed, the reusable object 607 having JOB as its scope is RIP-processed, thereby obtaining image data. That image data can be used by each page.

As in description of the input data shown in FIG. 6A to the output data shown in FIG. 6B, by increasing the range of use of a reusable object that is referred to many times, pieces of image data to be cached can be generated at one time, and hence the performance can be improved.

As has been described above, the document editing manager 113 according to the present embodiment receives an input of document data in which a reusable object whose scope is specified is defined (S401). The document editing manager 113 performs a control operation to change the scope of the reusable object according to page layout information specified in the page-layout setting column 316 of the hot folder shown in FIG. 3B (S408 or S412).

With the foregoing structure, the cache period of a reusable object in the document editing manager 113 can be optimized, and the capacity of memory required can be suppressed. This eliminates failures, such as a reduction in the operation performance of the document editing manager 113 when printing print data in which a reusable object is defined or incapability of the document editing manager 113 to print the print data.

The hot folder shown in FIG. 3B accepts an entry of a document in, for example, the PPML format. The foregoing processing to change the scope of a reusable object is performed based on, for example, information indicating whether to redefine the range of reuse of the reusable object set at the time the document in the PPML format is input to the hot folder. The information indicating whether to redefine the range of reuse of the reusable object is, for example, information indicating whether the "optimize cache range" key 320 shown in FIG. 3B is selectable.

The schematic structure of an image forming system according to a second embodiment of the present invention is similar to that of the image forming system according to the first embodiment shown in FIG. 1.

In the present embodiment, an example where the print-data processing apparatus is applied to the print manager 115 shown in FIG. 1 will be described.

The print manager 115 according to the present embodiment performs rasterizing processing (processing to convert data into bit map image data) of a job to be processed, which has been printing-pre-processed (document-edited and proofed). Thereafter, the rasterized image data is transferred to an image forming device serving as a print output destination, such as an MFP (at least one of the color MFPs 104a and 104b and the monochrome MFPs 105a, 105b, and 105c) via the network 101b. In this manner, the print manager 115 according to the present embodiment performs a control operation to cause the image forming device serving as the print output destination to print and output the image data that has been processed in various manners.

Figure 7:
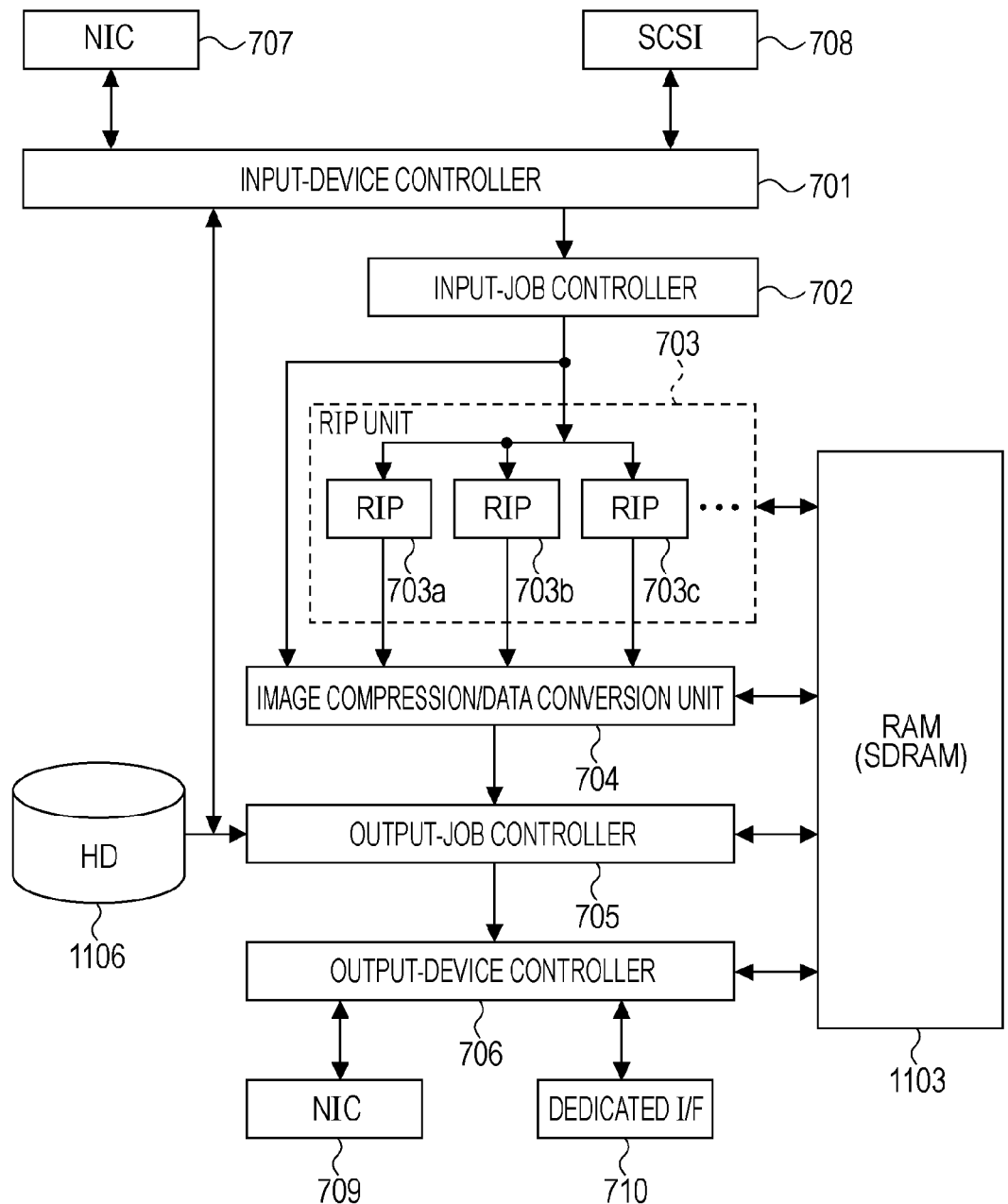
FIG. 7 is a block diagram of a functional structure of a print manager according to a second embodiment.

Referring to FIG. 7, the flow of data processing performed in the print manager 115 will be described.

FIG. 7 is a block diagram of a functional structure of the print manager 115 according to the present embodiment.

As shown in FIG. 7, the print manager 115 includes an input-device controller 701, an input-job controller 702, a RIP unit 703, an image compression/data conversion unit 704, and an output-job controller 705. The print manager 115 further includes an output-device controller 706, network interface cards (NICs) 707 and 709, a small computer system interface (SCSI) 708, a dedicated interface (I/F) 710, a RAM (synchronous dynamic RAM (SDRAM) in this case) 1103, and an HD 1106.

In the present embodiment, for example, the CPU 1101 and a program stored in the ROM 1102 shown in FIG. 11 constitute the input-job controller 702, the RIP unit 703, the image compression/data conversion unit 704, and the output-device controller 706 shown in FIG. 7. For example, the CPU 1101, a program stored in the ROM 1102, and the DKC 1105 shown in FIG. 11 constitute the input-device controller 701 and the output-job controller 705 shown in FIG. 7. For example, the I/F 1107 shown in FIG. 11 constitutes the NICs 707 and 709, the SCSI 708, and the dedicated I/F 710 shown in FIG. 7.

In the print manager 115 shown in FIG. 7, a job that has been moved to a print process using the process-control manager 111 shown in FIG. 1 is input to the input-device controller 701 via an interface including the NIC 707 or the SCSI 708. The input-device controller 701 accepts, as an input job, PDL data and job control language (JCL) data. JCL describes the name of a job, the type of a device to be used, etc. These pieces of data are status information of the image forming device (color MFP 104 or monochrome MFP 105), the print manager 115, etc., and correspond to various clients. Data output from the input-device controller 701 has the role of combining all elements of the appropriate PDL data and the JCL data.

The input-job controller 702 manages a list requested by an input job. In order to access individual jobs input to the process-control manager 111, the input-job controller 702 creates a job list. Furthermore, the input-job controller 702 has three functions: a job routing function of determining the route of jobs, a job splitting function of determining whether to split and to perform RIP processing of jobs, and a job scheduling function of determining the sequence of jobs.

The RIP unit 703 has a plurality of elements. These elements include, as shown in FIG. 7, a RIP 703a, a RIP 703b, and a RIP 703c. Alternatively, the number of elements can be increased if necessary. In this example, these elements are collectively referred to as the RIP unit 703. The RIP unit 703 performs RIP processing of PDL data in various jobs and generates data with appropriate size and resolution. In this case, the RIP processing may include rasterizing processing in various formats, such as PostScript, Printer Command Language (PCL), Tagged Image File Format (TIFF), Joint Photographic Experts Group (JPEG), Portable Document Format (PDF), and PPML.

The image compression/data conversion unit 704 performs processing such as compression and format conversion of bit map image data generated by the RIP unit 703. The image compression/data conversion unit 704 selects an optimal image type according to each image forming device (color MFP 104 or monochrome MFP 105).

The output-job controller 705 takes page images from the job and manages how these page images are handled on the basis of command settings. Page image data is printed by each image forming device (color MFP 104 or monochrome MFP 105) and stored as, for example, bit map image data in the HD 1106.

The manner in which the output-job controller 705 handles the page images of the job is determined according to, for example, output processing condition data from the client 103. Based on an instruction from the client 103, the output-job controller 705 can select whether to leave the job in the HD 1106 after the job is printed. In the case where the job after being printed is left in the HD 1106, every time a request is made from the client 103, the output-job controller 705 reads the job data from the HD 1106 and performs a control operation relating to desired re-output processing, such as printing and sending. Furthermore, the output-job controller 705 manages the foregoing processing not only in cooperation with the HD 1106, but also with the RAM (SDRAM in this case) 1103.

The output-device controller 706 performs a control operation to determine to which device the data is to be output or which devices are to be clustered (mode in which a plurality of image forming devices are enabled to perform parallel and simultaneous printing of a job output from a single image data generating source). The output-device controller 706 sends the print data to the interface of the selected device and enables the selected device to perform output processing, such as printing and sending.

The output-device controller 706 also performs the function to monitor the status of the color MFP 104 or the monochrome MFP 105, which is an image forming device. More specifically, the output-device controller 706 obtains information indicating the status of each image forming device from the image forming device via the NIC 709 or the dedicated I/F 710. Based on the obtained information, the output-device controller 706 monitors the status of the image forming device.

In this case, the information obtained from the image forming device includes, for example, information indicating whether the current status of the target image forming device is standby, information indicating whether the target image forming device is currently performing printing, and status information indicating the number of jobs queued for printing. Furthermore, the information obtained from the image forming device includes information indicating whether an error has occurred during printing, consumable-supply alert-status information of consumable supplies including recording paper and toner, identification information indicating the size and type of recording paper set in the image forming device, and function information indicating the functions of the image forming device.

When obtaining various pieces of information from the image forming device, the output-device controller 706 may obtain the information upon receipt of, for example, an information obtaining command. Alternatively, the output-device controller 706 may obtain the information periodically or in real-time without using the information obtaining command.

The print manager 115 shown in FIG. 7 includes the RIP unit 703. Alternatively, for example, the image forming device (color MFP 104 or monochrome MFP 105) may include the RIP unit 703. Alternatively, the RIP unit 703 may be a separate unit from the print manager 115. At any rate, the major role of the print manager 115, including the image forming device (color MFP 104 or monochrome MFP 105) and the RIP unit 703, is to perform RIP processing of PDL data in an input job and to perform a print process including a series of steps until the input job is printed and output.

Figure 8:
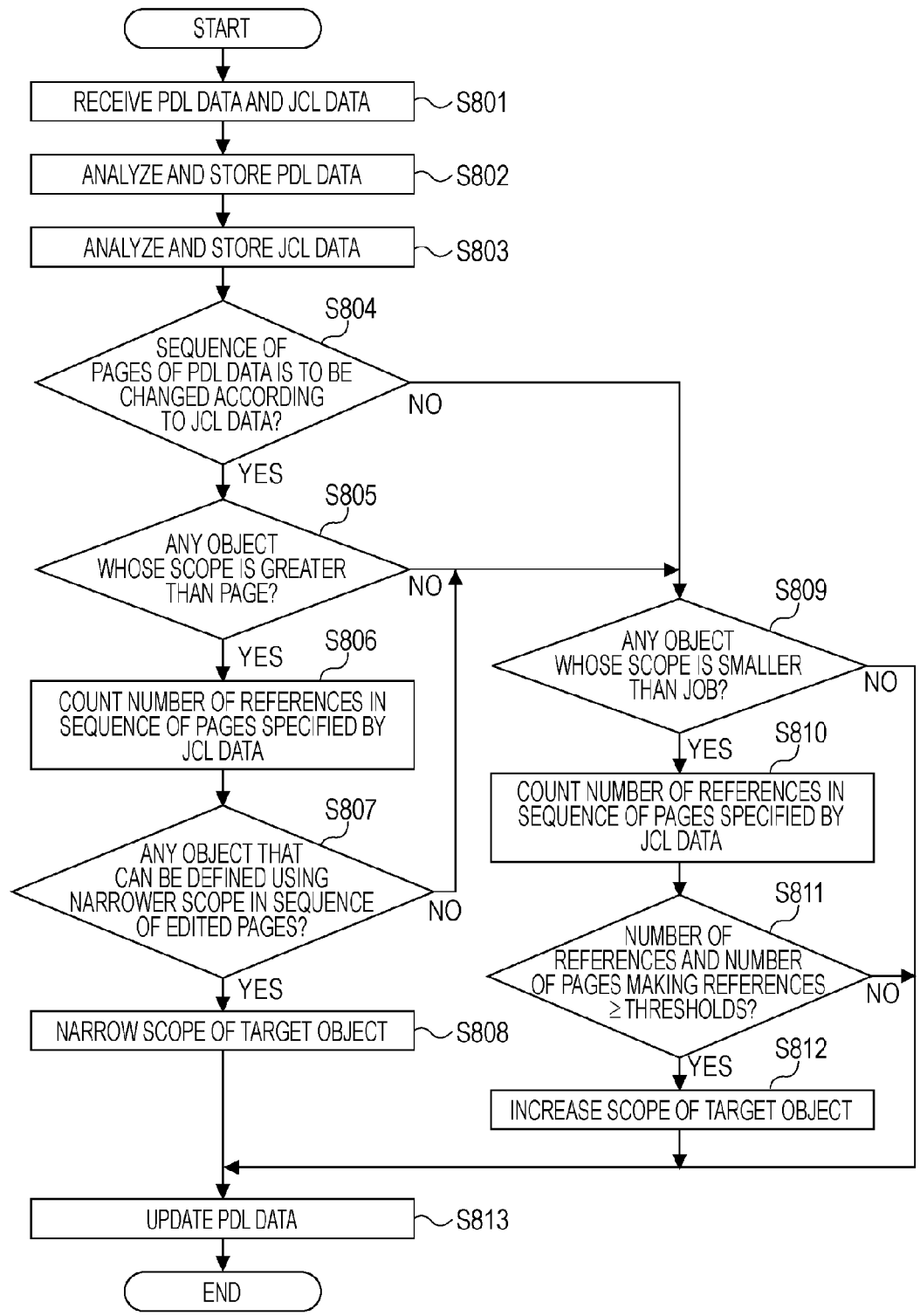
FIG. 8 is a flowchart of an internal process performed by the print manager according to the second embodiment.

FIG. 8 is a flowchart of an internal process performed by the print manager 115 according to the present embodiment. In this case, the process of the flowchart shown in FIG. 8 is performed by, for example, the CPU 1101, which is shown in FIG. 11, of the print manager 115. More specifically, the process is performed by the elements shown in FIG. 7.

In step S801, the CPU 1101 proceeds to a print process using the process-control manager 111 shown in FIG. 1 and receives an input of a job output via the document editing manager 113. In this case, the job corresponds to print data in which a reusable object whose scope is specified is defined.

The job is input as PDL data and JCL data. The JCL data includes, for example, information regarding various settings shown in FIGS. 3A and 3B.

In step S802, the CPU 1101 analyzes the PDL data of the input job and stores information regarding the analysis result in, for example, the RAM 1103. In this case, the CPU 1101 may store the information regarding the result of analyzing the PDL data in the HD 1106.

In step S803, the CPU 1101 analyzes the JCL data of the input job and stores information regarding the analysis result in, for example, the RAM 1103. In this case, the CPU 1101 may store the information regarding the result of analyzing the JCL data in the HD 1106.

In step S804, based on the result of analyzing the JCL data in step S803, the CPU 1101 determines whether the sequence of pages of the PDL data is to be changed according to a specification of the JCL data. In this case, for example, whether the sequence of pages of the PDL data is to be changed or not is determined based on the page layout information specified in the color setting column 318 of the hot folder shown in FIG. 3B, which is included in the JCL data.

When the determination in step S804 shows that the sequence of pages of the PDL data is to be changed, the flow proceeds to step S805. The CPU 1101 determines whether there is a reusable object (or may be simply referred to as an object) whose scope is greater than the page that has been set (step S805).

When the determination in step S805 shows that there is an object whose scope is greater than the page that has been set, the flow proceeds to step S806. In step S806, the CPU 1101 counts the number of references made to the object by each page, document, and job in the sequence of pages specified by the JCL data and stores the count value in, for example, the RAM 1103. In this case, the CPU 1101 may store the count value in the HD 1106.

In step S807, the CPU 1101 determines, in the sequence of edited pages, which is specified by the JCL data, whether there is an object that can be defined using a narrower scope.

When the determination in step S807 shows that there is an object that can be defined using a narrower scope, the CPU 1101 reduces the scope of the target object in step S808.

When the determination in step S804 shows that the sequence of pages of the PDL data is not to be changed, or when the determination in step S805 shows that there is no object whose scope is greater than the page that has been set, the flow proceeds to step S809. Alternatively, when the determination in step S807 shows that there is no object that can be defined using a narrower scope, the flow proceeds to step S809.

In step S809, the CPU 1101 determines whether there is an object whose scope is smaller than a job.

When the determination in step S809 shows that there is an object whose scope is smaller than a job, the flow proceeds to step S810. In step S810, the CPU 1101 counts the number of references made to the object by each page, document, and job in the sequence of pages before the document is imposed as specified by the JCL data, and stores the count value in, for example, the RAM 1103. In this case, the CPU 1101 may store the count value in the HD 1106.

In step S811, the CPU 1101 determines whether the number of references and the number of pages making the references are greater than or equal to threshold values.

When the determination in step S811 shows that the number of references and the number of pages making the references are greater than or equal to the threshold values, the CPU 1101 increases the scope of the target object in step S812.

After the processing in step S808 or S812 is completed, or when the determination in step S809 shows that there is no object whose scope is smaller than a job, the flow proceeds to step S813. Alternatively, when the determination in step S811 shows that the number of references and the number of pages making the references are less than the threshold values, the flow proceeds to step S813.

In step S813, the CPU 1101 updates the PDL data received in step S801, and the process including a series of steps shown in FIG. 8 is completed.

As has been described above, the print manager 115 according to the present embodiment receives an input of PDL data and JCL data as a job in which a reusable object whose scope (the range of reuse) is specified is defined (S801). The print manager 115 performs a control operation to change the scope of the reusable object according to page layout information specified in the page-layout setting column 316 of the hot folder shown in FIG. 3B (S808 or S812). With the foregoing structure, the cache period of a reusable object in the print manager 115 can be optimized, and the capacity of memory required can be suppressed. This eliminates failures, such as a reduction in the operation performance of the print manager 115 when printing print data in which a reusable object is defined or incapability of the print manager 115 to print the print data.

The schematic structure of an image forming system according to a third embodiment of the present invention is similar to that of the image forming system according to the first embodiment shown in FIG. 1.

An example where the print-data processing apparatus according to the present embodiment is applied to the color MFP 104 or the monochrome MFP 105 shown in FIG. 1 will now be described.

Figure 9:
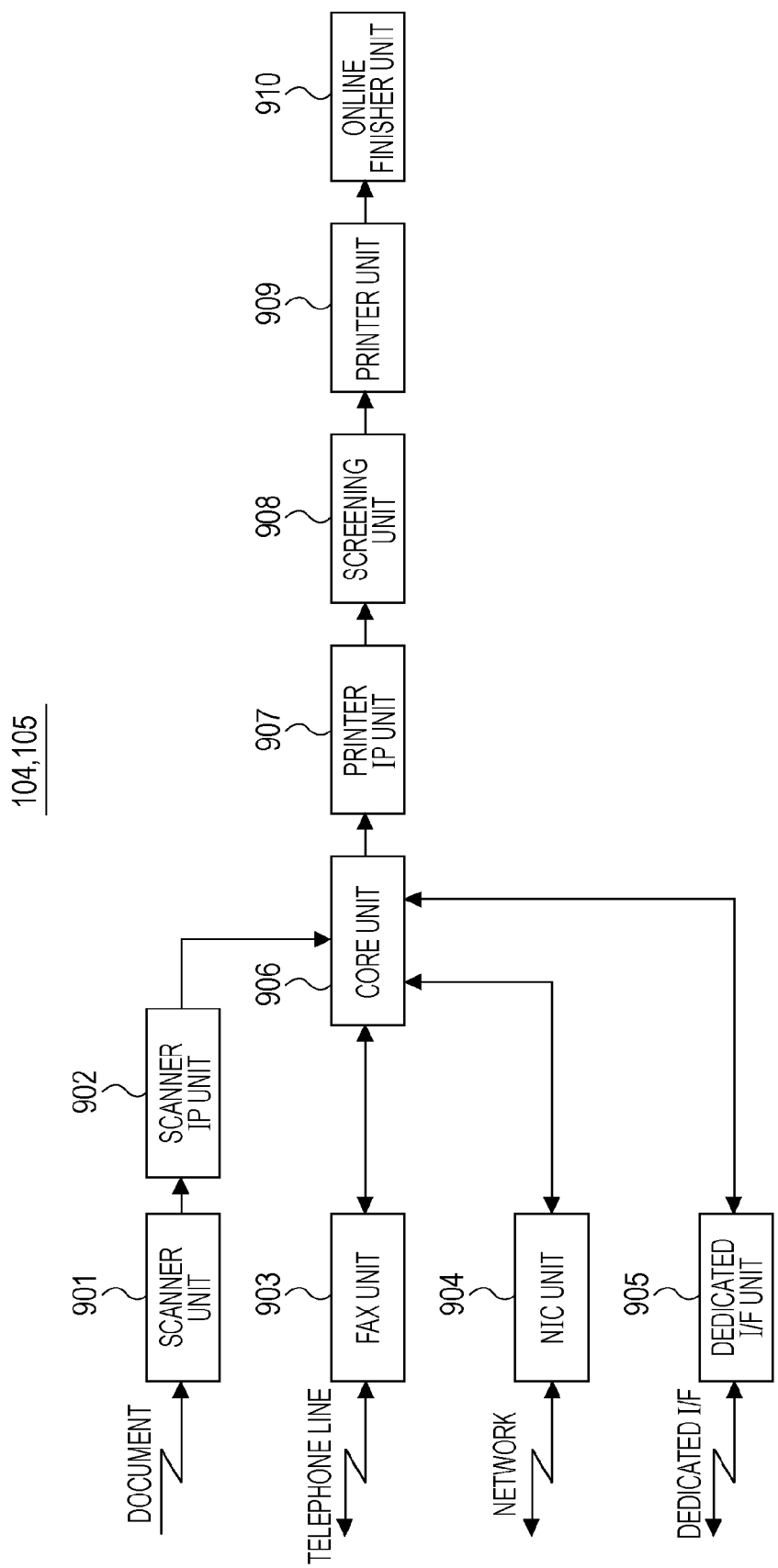
FIG. 9 is a block diagram of a schematic structure of a multifunctional peripheral device (MFP) according to a third embodiment.

FIG. 9 is a block diagram of a schematic structure of the color MFP 104 (or the monochrome MFP 105) according to the present embodiment.

Referring to FIG. 9, the color MFP 104 (or the monochrome MFP 105) includes a scanner unit 901, a scanner IP unit 902, a facsimile (FAX) unit 903, a NIC unit 904, a dedicated I/F unit 905, a core unit 906, a printer IP unit 907, a screening unit 908, a printer unit 909, and an online finisher unit 910.

The scanner unit 901 performs scanning of an image of an input document. The scanner IP unit 902 performs various types of image processing on image data of the image scanned by the scanner unit 901. The FAX unit 903 performs sending and receiving of image data using a telephone line. The NIC unit 904 performs sending and receiving of image data and various types of information with an external device using a network. The dedicated I/F unit 905 performs communication with other MFPs connected thereto via a dedicated I/F.

The core unit 906 controls all the elements (the scanner unit 901 to the dedicated I/F unit 905, and the printer IP unit 907 to the online finisher unit 910) in the color MFP 104 (or the monochrome MFP 105).

More specifically, the core unit 906 performs a control operation to temporarily store image data or to determine a channel in accordance with the use of the color MFP 104 (or the monochrome MFP 105). The core unit 906 shown in FIG. 9 includes, for example, the computer 1100 shown in FIG. 11. That is, the core unit 906 includes the HD 1106 capable of storing various pieces of image data, as has been described above. For example, the CPU 1101 in the core unit 906 plays the major role to control all the elements (the scanner unit 901 to the dedicated I/F unit 905, and the printer IP unit 907 to the online finisher unit 910).

More specifically, the CPU 1101 in the core unit 906 performs a control operation to process various types of image data, such as image data from the scanner unit 901, image data of a facsimile job received via the FAX unit 903, image data received via the NIC unit 904, or image data received via the dedicated I/F unit 905, and to store the image data in the HD 1106 in the core unit 906. The CPU 1101 in the core unit 906 performs a control operation to read the image data stored in the HD 1106 as needed, to transfer the image data to an output unit such as the printer unit 909, and to enable the printer unit 909 to perform output processing, such as printing. In response to an instruction from the user (client 103), the CPU 1101 in the core unit 906 performs a control operation to transfer the image data read from the HD 1106 to an external device, such as an external computer or another MFP.

The image data output from the core unit 906 is sent via the printer IP unit 907 and the screening unit 908 to the printer unit 909 which performs image forming processing. The printer unit 909 prints and outputs the image data onto sheets (recording paper), and the recording paper is conveyed to the online finisher unit 910. The online finisher unit 910 performs sorting and finishing of the recording paper.

The core unit 906 shown in FIG. 9 performs traffic control of the bus (channel). Bus switching is performed according to the use of the MFP (MFP 104 or MFP 105). When data is sent via a network, it is generally known that compressed data such as data in the JPEG, Joint Bi-level Image Experts Group (JBIG), or ZIP format or the like is used. When data enters the color MFP 104 (or the monochrome MFP 105), the data is decompressed by the core unit 906 in the color MFP 104 (or the monochrome MFP 105). In the present embodiment, the RIP unit 703 shown in FIG. 7 is contained in the core unit 906 of the color MFP 104 (or the monochrome MFP 105).

Figure 10:
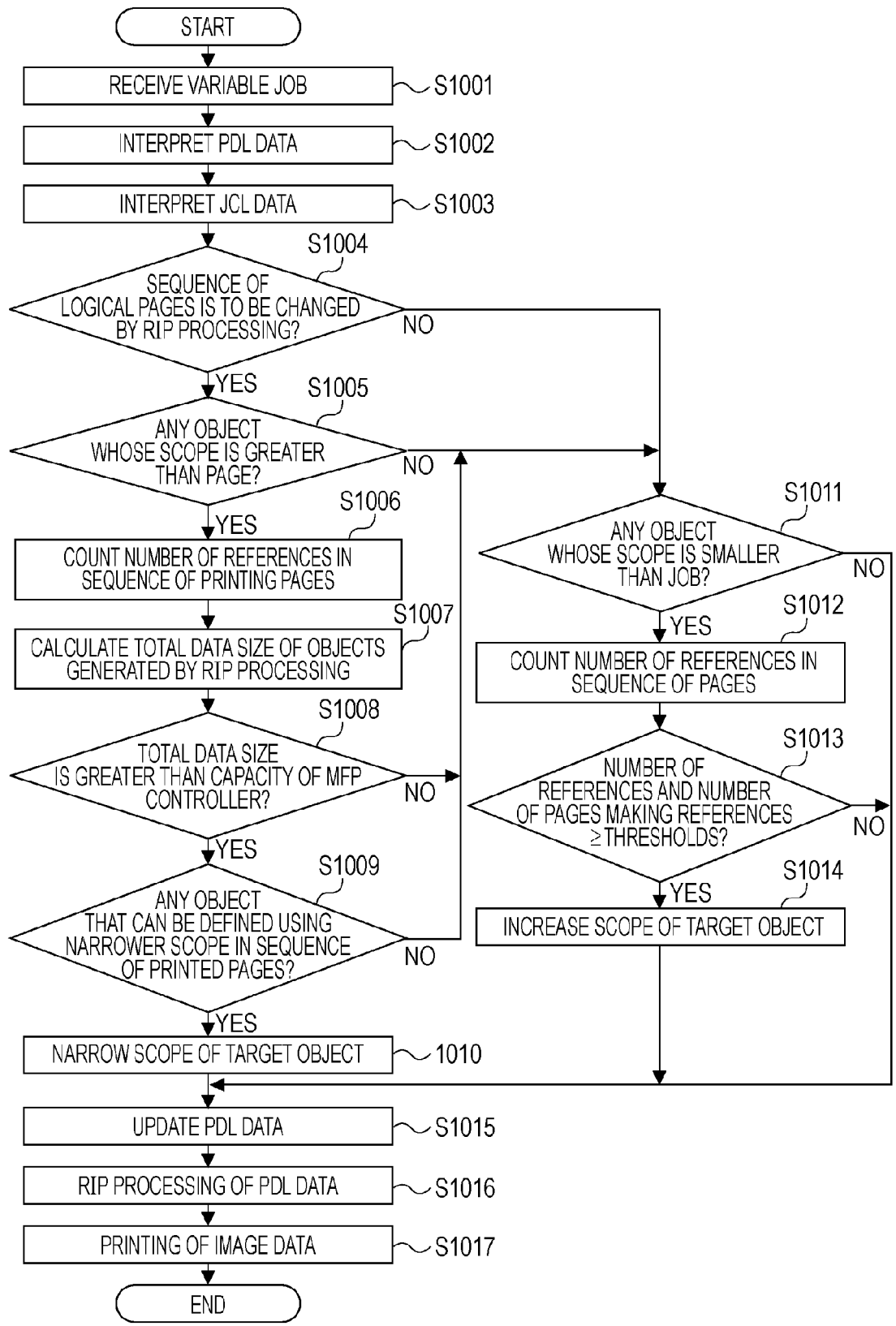
FIG. 10 is a flowchart of an internal process performed by the MFP according to the third embodiment.

FIG. 10 is a flowchart of an internal process performed by the color MFP 104 (or the monochrome MFP 105) according to the present embodiment. In this case, the process of the flowchart shown in FIG. 10 is performed by, for example, the CPU 1101 in the core unit 906 of the color MFP 104 (or the monochrome MFP 105).

In step S1001, the CPU 1101 receives a variable job output from the print manager 115 via the network 101b and the NIC unit 904. In this case, the variable job relates to print data in which a reusable object whose scope is specified is defined. Here, the variable job is input as PDL data and JCL data. The JCL data includes, for example, information regarding various types of settings shown in FIGS. 3A and 3B.

In step S1002, the CPU 1101 performs interpreting of the PDL data in the variable job.

In step S1003, the CPU 1101 performs interpreting of the JCL data in the variable job.

In step S1004, the CPU 1101 determines whether the sequence of logical pages defined by the PDL data is to be changed by RIP processing. In this case, for example, whether the sequence of logical pages defined by the PDL data is to be changed or not is determined based on the page layout information defined in the page-layout setting column 316 of the hot folder shown in FIG. 3B, which is included in the JCL data.

When the determination in step S1004 shows that the sequence of logical pages defined by the PDL data is to be changed, the flow proceeds to step S1005. In step S1005, the CPU 1101 determines whether there is a reusable object (or may be simply referred to as an object) whose scope is greater than the page that has been set.

When the determination in step S1005 shows that there is an object whose scope is greater than the page that has been set, the flow proceeds to step S1006. In step S1006, the CPU 1101 counts the number of references made to the object by each page, document, and job in the sequence of printing pages and stores the count value in, for example, the RAM 1103 in the core unit 906. In this case, the CPU 1101 may store the count value in the HD 1106 in the core unit 906.

In step S1007, the CPU 1101 calculates the data size of each object generated by RIP processing, calculates the total data size, and stores information indicating the total data size in, for example, the RAM 1103 in the core unit 906. In this case, the information indicating the total data size may be stored in the HD 1106 in the core unit 906.

In step S1008, the CPU 1101 determines whether the total data size of the objects generated by RIP processing, which has been calculated in step S1007, is greater than the capacity of an MFP controller (e.g., the core unit 906).

When the determination in step S1008 shows that the total data size of the objects generated by RIP processing, which has been calculated in step S1007, is greater than the capacity of the MFP controller, the flow proceeds to step S1009. In step S1009, the CPU 1101 determines, in the sequence of printed pages, whether there is an object that can be defined using a narrower scope.

When the determination in step S1009 shows that there is an object that can be defined using a narrower scope, in step S1010, the CPU 1101 narrows the scope of the target object.

When the determination in step S1004 shows that the sequence of logical pages defined by the PDL data is not to be changed, or when the determination in step S1005 shows that there is no object whose scope is greater than the page that has been set, the flow proceeds to step S1101. Alternatively, when the determination in step S1008 shows that the total data size of the objects generated by RIP processing is less than the capacity of the MFP controller, the flow proceeds to step S1011. Alternatively, when the determination in step S1009 shows that there is no object that can be defined using a narrower scope, the flow proceeds to step S1011.

In step S1011, the CPU 1101 determines whether there is an object whose scope is smaller than a job.

When the determination in step S1011 shows that there is an object whose scope is smaller than a job, the flow proceeds to step S1012. In step S1012, the CPU 1101 counts the number of references made to the object by each page, document, and job in the sequence of pages based on RIP-processing and stores the count value in, for example, the RAM 1103 in the core unit 906. In this case, the count value may be stored in the HD 1106 in the core unit 906.

In step S1013, the CPU 1101 determines whether the number of references and the number of pages making the references are greater than or equal to threshold values.

When the determination in step S1013 shows that the number of references and the number of pages making the references are greater than or equal to the threshold values, the CPU 1101 increases the scope of the target object in step S1014.

After the processing in step S1010 or S1014 is completed, or when the determination in step S1011 shows that there is no object whose scope is smaller than a job, the flow proceeds to step S1015. Alternatively, when the determination in step S1013 shows that the number of references and the number of pages making the references are less than the threshold values, the flow proceeds to step S1015.

In step S1015, the CPU 1101 updates the PDL data in the variable job received in step S1001.

In step S1016, the CPU 1101 performs RIP processing of the PDL data.

In step S1017, the CPU 1101 performs a control operation relating to printing of the image data, and a series of steps shown in FIG. 10 is completed.

As has been described above, the color MFP 104 (or the monochrome MFP 105) according to the present embodiment receives a variable job in which a reusable object whose scope (reusable range) is specified is defined (S1001). The color MFP 104 (or the monochrome MFP 105) performs a control operation to change the scope in accordance with the page layout information defined in the page-layout setting column 316 of the hot folder shown in FIG. 3B, which is included in the JCL data in the variable job (S1010 or S1014).

With the foregoing structure, the cache period of a reusable object in the color MFP 104 (or the monochrome MFP 105) can be optimized, and the capacity of memory required can be suppressed. This eliminates failures, such as a reduction in the operation performance of the color MFP 104 (or the monochrome MFP 105) when printing print data in which a reusable object is defined or incapability of the color MFP 104 (or the monochrome MFP 105) to print the print data.

The elements shown in FIGS. 7, 9, and 11 of the print-data processing apparatuses according to the foregoing embodiments and the steps shown in FIGS. 4, 8, and 10 of the print-data processing methods are realized by running, for example, a program stored in the ROM 1102 shown in FIG. 11. The program and a computer-readable storage medium in which the program is recorded are included in embodiments of the present invention.

More specifically, the program is supplied to a computer via a storage medium, such as a compact disc read-only memory (CD-ROM), in which the program is recorded therein, or via various transfer media. Storage media capable for recording the program include, besides the CD-ROM, a floppy disk, a hard disk, a magnetic tape, a magneto-optical disk, a non-volatile memory card, and the like. In contrast, transfer media for transferring the program include communication media in computer network systems (LAN, a wide area network (WAN) such as the Internet, a wireless communication network, and the like) for spreading program information as a carrier wave. The communication media include, for example, wired lines including optical fibers, wireless links, and the like.

The functions of the print-data processing apparatuses according to the embodiments are implemented by the computer executing the supplied program. Furthermore, in the case where the program cooperates with an operating system (OS) running on the computer or other application software to implement the functions of the print-data processing apparatuses according to the embodiments, the program is included in an embodiment of the present invention. Furthermore, in the case where the functions of the print-data processing apparatuses according to the embodiments are realized by a function expansion board or a function expansion unit of the computer performing the entirety or part of the processing performed using the supplied program, the program is included in an embodiment of the present invention.

According to embodiments of the present invention, failures, such as a reduction in the operation performance of a print-data processing apparatus when printing print data in which a reusable object is defined or incapability of the print-data processing apparatus to print the print data, can be avoided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-110956 filed Apr. 19, 2007, which is hereby incorporated by reference herein in its entirety.

What is claimed is:

1. A print-data processing apparatus comprising:
an input unit configured to receive an input of a print setting of print data and receive the print data, wherein a reusable object is defined in the print data and the reusable object first range of use is specified in the print data; and
a control unit configured to perform a control operation to change, according to a page layout defined by the received print setting, the first range of use of the reusable object to a second range of use that is narrower than the first range of use,
wherein the control unit changes print data, in which a reusable object, whose range of use is a job having multiple pages to be printed, and a reference command, which is located between a page start command and a page end command for a particular page to be printed and refers to the reusable object, are located between a job start command and a job end command, to print data in which both the reusable object and the reference command are located between the page start command and the page end command so that the range of use of the reusable object is narrowed from the first range of use indicating the job to the second range of use indicating the particular page to be printed.

2. The print-data processing apparatus according to claim 1, wherein the first range of use is at least one of a job, a document, and a document setting, and the second range of use is a page.

3. The print-data processing apparatus according to claim 1, wherein the control operation performed by the control unit to change the range of use of the reusable object is performed based on information indicating whether to redefine the range of use of the reusable object that has been set in response to a document in a Personalized Print Markup Language format being input to a hot folder configured to receive an input of a document in the Personalized Print Markup Language format.

4. The print-data processing apparatus according to claim 1, wherein, in response to the range of use of the reusable object included in the print data being set as a job and bookbinding printing is set, the control unit determines whether to change the range of use from a job to a page based on a layout determined for bookbinding printing.

5. A method for processing print data, the method comprising:
receiving an input of a print setting of print data and receiving the print data, wherein a reusable object is defined in the print data and the reusable object first range of use is specified in the print data; and
performing, using a central processing unit, a control operation to change, according to a page layout defined by the received print setting, the first range of use of the reusable object to a second range of use that is narrower than the first range of use,
wherein performing the control operation includes changing print data, in which a reusable object, whose range of use is a job having multiple pages to be printed, and a reference command, which is located between a page start command and a page end command for a particular page to be printed and refers to the reusable object, are located between a job start command and a job end command, to print data in which both the reusable object and the reference command are located between the page start command and the page end command so that the range of use of the reusable object is narrowed from the first range of use indicating the job to the second range of use indicating the particular page to be printed.

6. The method according to claim 5, wherein the first range of use is at least one of a job, a document, and a document setting, and the second range of use is a page.

7. The method according to claim 5, wherein the performed control operation to change the range of use of the reusable object is performed based on information indicating whether to redefine the range of use of the reusable object that has been set in response to a document in a Personalized Print Markup Language format being input to a hot folder configured to receive an input of a document in the Personalized Print Markup Language format.

8. The method according to claim 5, wherein, in response to the range of use of the reusable object included in the print data being set as a job and bookbinding printing is set, performing the control operation includes determining whether to change the range of use from a job to a page based on a layout determined for bookbinding printing.

9. A non-transitory computer-readable storage medium storing a computer-readable program, the computer-readable program causing a computer to execute the method of claim 5.

* * * * *